United States Patent
Begovich

[15] 3,683,493
[45] Aug. 15, 1972

[54] METHOD AND APPARATUS FOR MANUFACTURING A SQUIRREL CAGE ROTOR

[72] Inventor: Charles Begovich, Troy, Ohio
[73] Assignee: General Motors Corporation, Detroit, Mich.
[22] Filed: April 7, 1970
[21] Appl. No.: 26,191

[52] U.S. Cl. ............................................. 29/598
[51] Int. Cl. ....................... H02k 15/02, H02k 15/04
[58] Field of Search ........ 29/598, 463, 470.5; 72/354

[56] References Cited

UNITED STATES PATENTS

| | | | |
|---|---|---|---|
| 3,093,888 | 6/1963 | Huguley | 29/598 |
| 1,408,890 | 3/1922 | Kimble | 29/598 |
| 2,125,970 | 8/1938 | Waters | 29/598 |
| 3,371,410 | 3/1968 | Gintovt | 29/598 |
| 3,469,309 | 9/1969 | Sagalow | 29/598 |
| 3,496,632 | 2/1970 | Deming et al. | 29/598 |
| 2,996,791 | 8/1961 | Hicks | 29/598 |
| 3,191,270 | 6/1965 | Martin et al. | 29/598 |
| 1,695,799 | 12/1928 | Daun | 29/598 |
| 3,139,921 | 7/1964 | Roberts | 72/354 X |
| 2,953,826 | 9/1960 | Larsh | 29/598 |

Primary Examiner—Theron E. Condon
Assistant Examiner—Horace M. Culver
Attorney—E. W. Christen, C. R. Meland and Richard G. Stahr

[57] ABSTRACT

A method and apparatus for fabricating conductor bars and end rings in a squirrel cage rotor wherein a hollow slug of conductive material is heated and extruded through the winding slots of a rotor core to form conductor bars and conductive end rings in an integral squirrel cage winding assembly.

4 Claims, 11 Drawing Figures

Patented Aug. 15, 1972

INVENTOR.
Charles Begovich
BY
Robert W. Smith
ATTORNEY

INVENTOR
Charles Begovich
BY
Robert W. Smith
ATTORNEY

Patented Aug. 15, 1972

INVENTOR.
Charles Begovich
BY
Robert W. Smith
ATTORNEY

METHOD AND APPARATUS FOR MANUFACTURING A SQUIRREL CAGE ROTOR

This invention relates to the manufacture of dynamo-electric machines having squirrel cage rotors and more particularly to a method and apparatus for assembling a squirrel cage winding assembly to a rotor core by an extrusion process.

In the manufacture of squirrel cage rotors for electric induction motors, various techniques have been employed for fabricating and assembling conductor bar windings in the slots of a rotor core and for assembling conductive end rings to the ends of the bar windings. In one method, solid bars of conductive material are inserted into the slots. Expensive machining and assembling apparatus are required and it is difficult to fill the slots since they are usually skewed. In this method, end rings are usually cast on the opposite ends of the bars in a separate manufacturing step. In a widely employed method, squirrel cage windings are formed by die casting a conductive metal such as aluminum to a rotor core. Bar conductors and conductive end rings can be formed concurrently in accordance with known casting techniques. For example, end ring molds having annular cavities are placed at the ends of the rotor core to receive the molten casting material as it is cast into the rotor slots so that the conductor bars and end rings are formed at the same time.

Casting techniques are often troublesome because they involve handling and working of hot molten metal in casting machines which are sometimes elaborate and expensive. One of the chief difficulties found in forming windings by casting methods is maintaining the purity of the cast metal. Voids and gas pockets are produced by entrapment of air caused by turbulence of the casting material during casting and by bubbles of dissolved gases such as hydrogen. Shrinkage cracks are also formed when the casting cools because of changes in density between the molten state and the solid state.

The non-homogenous castings produce undesirable electrical performance characteristics in the cast rotor windings. For example, a substantial decrease in the electrical conductivity of the conductor metal has been noted following casting. The castings are sometimes faulty and not uniform and must be rejected as failing production and reliability specifications. Also, the cast rotor windings and end rings are often unbalanced and non-symmetrical so as to require extensive balancing and machining operations to correct for the defects in the casting.

Figure 7:
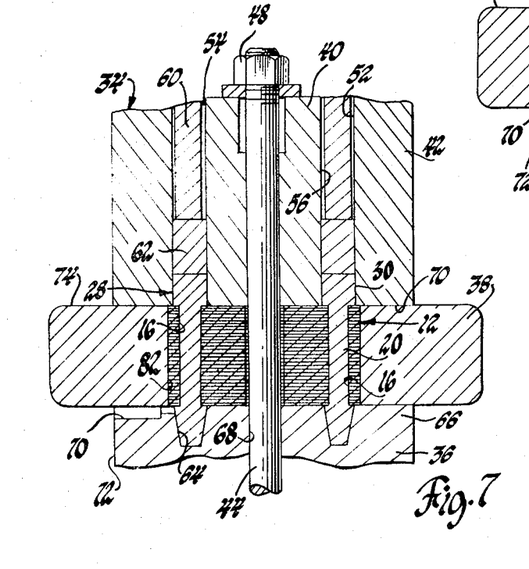
FIG. 7 is still another view of the extrusion press assembly of FIG. 3 wherein the parts of the assembly have a position corresponding to the final operative position of the assembly.

In a preferred embodiment of the present invention for a method and apparatus for forming a squirrel cage winding in a rotor assembly, a laminated rotor core having a plurality of slots is mounted in an extrusion press assembly and a heated aluminum slug is extruded into the rotor slots to form uniform and homogeneous conductor bars and integral end rings. The aluminum slug has a hollow cylinder shape and is mounted in an annular extrusion chamber. The slug is heated to an elevated temperature below the melting temperature and a hydraulically operated ram presses the aluminum slug against one end of the rotor core. The slug material flows into the slots to form conductor bars therein. One end ring is formed by a die plate having an annular die cavity positioned adjacent the opposite end of the rotor core. The extruded material exited from the slots is pressed therein to form an integral end ring. An opposite end ring is formed by a terminal portion of the aluminum slug extending a predetermined length from the one end of the rotor core after the slots have been filled. core 12 when the final position of the extrusion press assembly is reached as shown in FIG. 7 wherein conductor bars 20 are formed with integral end ring portions at opposite ends thereof.

The ram 60 and piston 62 are removed from the extrusion assembly 34 and the bolts 58 and 44 are removed so that the parts of the assembly can be separated. The motor core 12 with the squirrel cage winding assembly 18 is forced out of the mounting block 38. The end rings are operatively complete although further finishing or shaping may be provided by a die forming procedure or machining operation.

A primary object of this invention is to provide an improved process for fabrication of squirrel cage rotors wherein a conductive metal slug is extruded into the slots of a rotor core to form conductor bar windings therein.

A further object of this invention is to provide an economical and reliable method and apparatus for fabricating squirrel cage conductor bars and integral end rings which have reduced defects and increased purity, and further wherein a hollow conductive slug is heated and extruded through one end of the slots of a rotor core.

A further object of this invention is to provide a method and apparatus for fabricating conductor bars and integral end rings from a hollow cylindrical aluminum slug in which an extrusion press assembly extrudes the slug through the slots of a rotor into an end ring die cavity so that an end ring is formed by the excess of extruded material which exits from the slots, and further, wherein an opposite end ring is formed by an unextruded terminal portion of the hollow slug.

A still further object of this invention is to provide a method and apparatus for fabricating conductor bars and integral end rings in a squirrel cage rotor by extruding a hollow cylindrical slug through the slots of a rotor core so as to form conductor bars therein which are integral with annular sections formed at each end of the rotor core, and further, wherein end rings having a finished shape are formed by pressing the annular sections into end ring die cavities of die plates forced against the ends of the rotor core.

Further objects and advantages of the present invention will be apparent from the following description, reference being had to the accompanying drawing in which preferred embodiments of the apparatus and method of operation of the present invention are illustrated.

Figure 1:
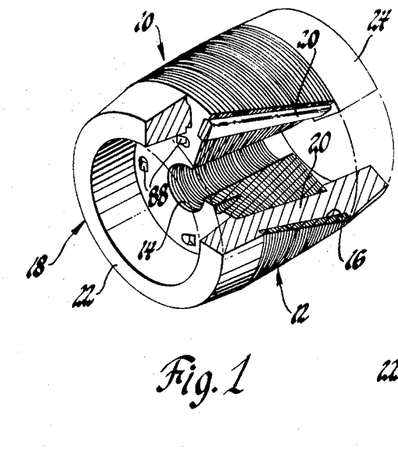
FIG. 1 is a perspective view, partially sectioned and broken away, of a squirrel cage rotor fabricated in accordance with the present invention.

Referring now to the drawings, FIG. 1 illustrates a squirrel cage rotor 10 made in accordance with the present invention. The squirrel cage rotor 10 includes a cylindrical rotor core 12 formed by a stack of laminations made of a magnetic material. The rotor core 12 includes a center opening 14 which is mounted on a motor shaft and a circumferential series of axial slots 16 near the outer diameter. The slots are disposed in a skewed or inclined relationship with respect to the longitudinal axis of the rotor core 12.

Figure 2:
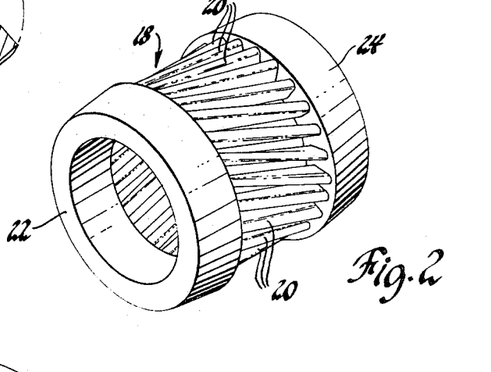
FIG. 2 is a perspective view of the squirrel cage winding assembly fabricated in the squirrel cage rotor of FIG. 1.

A squirrel cage winding assembly 18 disposed in the rotor core 12 comprises conductor bars 20 filling the slots 16 and conductive end rings 22 and 24 formed at the ends of the rotor core 12. The end rings 22 and 24 are integral with the respective ends of the conductor bars 20 so as to electrically interconnect and provide short circuiting conductor paths at the ends of the conductor bars 20. FIG. 2 illustrates the squirrel cage winding assembly 18 as it appears with the rotor core 12 removed.

Figure 3:
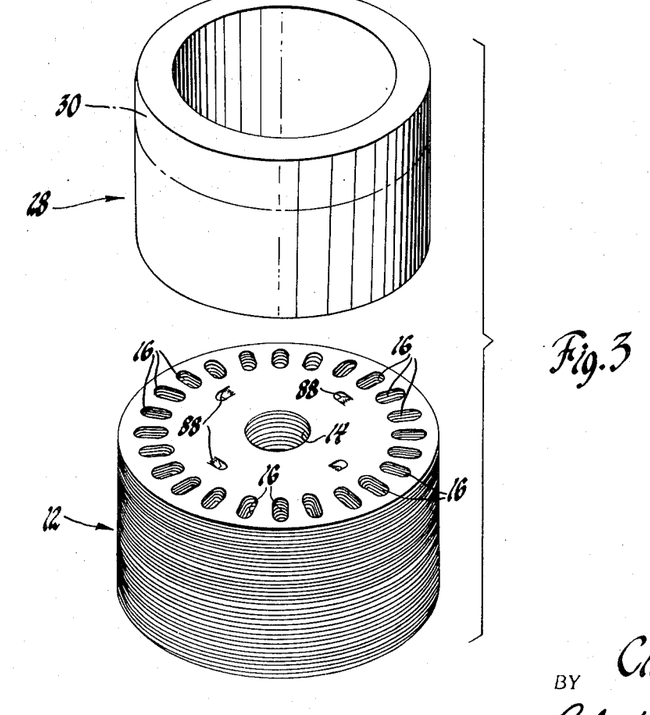
FIG. 3 is a perspective view of a hollow cylindrical slug and a rotor core used to fabricate a squirrel cage winding assembly made in accordance with the present invention.

FIG. 3 illustrates a metal slug 28 and the rotor core 12 arranged as they are mounted in an extrusion press apparatus described more fully hereinbelow. The slug 28 is made of an electrically conductive metal material and is mounted adjacent one end of the slots 16 of the rotor core 12. Preferably, the slug 28 has a hollow cylindrical shape and is formed from a commercially available grade of substantially pure aluminum. Other conductive metals such as copper may be used where different performance characteristics for the winding 18 are desired. The slug 28 is heated and extruded into the slots 16 to form conductor bars 20 therein. The extrudate or extruded material exited from an opposite end of the rotor core 12 provides the conductive material which forms the end ring 22. The end ring 24 is formed by an upper terminal portion 30 of the slug 28.

Figure 4:
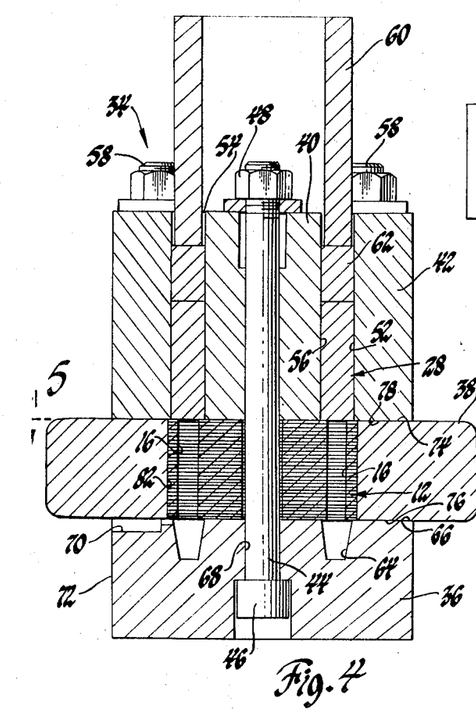
FIG. 4 is a sectional side elevational view of an extrusion press assembly used in the present invention.
Figure 5:
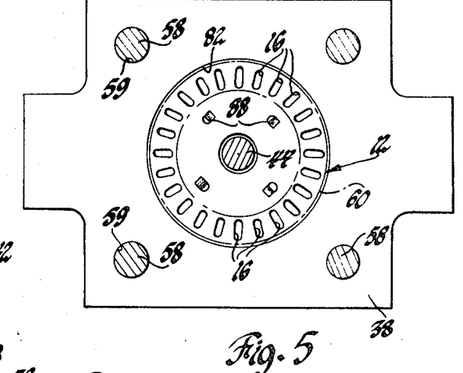
FIG. 5 is a transverse sectional view of the extrusion press assembly of FIG. 4, indicated by line 5—5 in FIG. 4, looking in the direction of the arrows.
Figure 6:
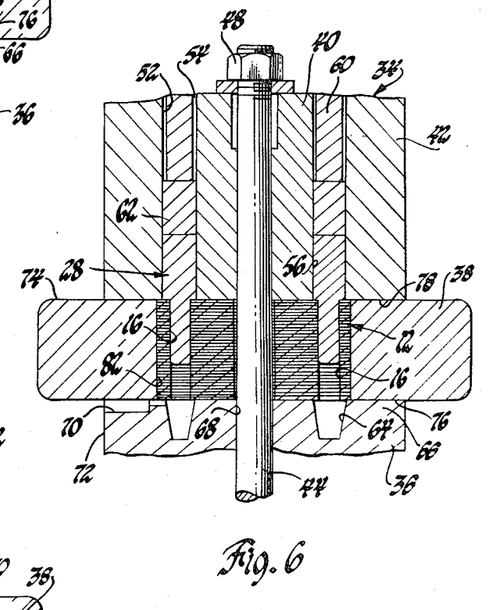
FIG. 6 is another view of the extrusion press assembly shown in FIG. 4 with the parts of the assembly having a different operative position.

An extrusion press assembly 34, of one preferred embodiment for carrying out the method of my invention, is shown in FIGS. 4 through 7, inclusive. Various operative positions of the extrusion press assembly 34 are shown in FIGS. 4, 6 and 7. The component parts of the assembly 34 include a die plate 36, a rotor mounting block 38, a mandrel 40 and a guide block 42. The die plate 36 forms the base of the assembly which is shown being vertically arranged. It is to be understood that the assembly 34 is also operative in other than the vertical position.

The rotor mounting block 38 supports and aligns the rotor core 12 within the extrusion press assembly 34. The mandrel 40 has an elongated cylindrical shape and clamps the rotor core 12 against the die plate 36 by means of a bolt 44 having a head 46 and nut 48. The guide block 42 includes a circular bore 52 which defines the outer wall of an annular extrusion chamber 54. The outer cylindrical surface 56 of the mandrel 40 defines the inner wall of the extrusion chamber 54. The guide block 42, mounting block 38 and the die plate 36 are clamped together by four bolts 58 extending through mutually aligned openings 59 extending through the three parts. Alternatively, the bolts 44 and 58 may be replaced by mounting the assembly 34 in a press which is adapted to clamp the assembly part together. This permits faster assembly and disassembly of the assembly parts.

A ram 60 actuated by a hydraulic press applies force to an annular piston 62 which has a tight, sliding fit against the opposing walls of the extrusion chamber 54. The slug 28 is placed on top of the rotor core 12 and is forced against the upper end of the rotor core 12 by the piston 62 and ram 60 as described further hereinbelow. The ram 60 has a generally hollow cylindrical shape and moves freely within the extrusion chamber 54.

The die plate 36 includes an end ring die cavity 64 on the upper end 66 thereof that is formed by an annular groove. The cross section of the die cavity is trapezoidal for forming a finished shaped end ring which tapers inwardly at the outer end. The opening of the die cavity 64 extends slightly beyond the inner and outer radial edges of the bottom openings of the slots 16. An axial hole 68 extends through the die plate 36 and is concentric with the die cavity 64 for receiving the bolt 44. A plurality of vent openings 70 extend radially along the upper end 66 between the outer side 72 of the die plate 36 and the die cavity 64 to receive the flash or excess extruded material when the die cavity 64 is filled.

The mounting block 38 includes upper and lower flat ends 74 and 76 which are clamped between a lower flat end 78 of the guide block 42 and the upper end 66 of the die plate 36. A cylindrical wall 82, shown in the sectional view of FIG. 4, is formed in the mounting block 38 which provides a force fit for engagement with the outer diameter of the rotor core 12. The mounting block 38 restrains radial deflection of the rotor laminations and lateral displacement of the rotor core 12 relative to the assembly 34 during the extrusion operation.

The wall of the bore 52 in the guide block 42 and the cylindrical wall 56 of the mandrel 40 are parallel and extend axially so as to align with the end openings of the slots 16 at the upper end of the rotor core 12. The cross section of the extrusion chamber is slightly larger than that of the slug 28. Therefore, the extrusion chamber 54 is aligned and communicates with the slot openings of the end lamination at the upper end of the rotor core 12 so that slots effectively provide extrusion die openings. The slug 28 is deformed by the edges of these slots of the end lamination as it is forced into the slots 16.

Referring now to a preferred extrusion process of my invention, the rotor core 12 is press fitted into the cylindrical wall 82. The rotor core 12 is a type which is provided in accordance with the rotor core and apparatus for assembly thereof as disclosed in U.S. Pat. No. 3,110,831 to Zimmerle, issued Nov. 12, 1963, assigned to the assignee of this invention. As described in this patent, the rotor core 12 is formed by a plurality of stacked laminations having offset segments 88 which interlock with adjacent laminations when the stack is compressed. An integral stack of laminations forms the rotor core 12 without welding or other clamping means such as bolts being used. The laminations are oriented so that the slots 16 are skewed at a predetermined angle of 18° to 20° relative to the core longitudinal axis with the sides of the slots extending parallel to the axis of the rotor core and adjacent the outer diameter thereof.

In one typical example, the rotor core 12 has a diameter of approximately 2.625 inches, a height of approximately 1.375 and a circumferential series of 30 axial slots 16 each having a radially extending height of approximately 0.22 inch and a width of 0.09 inch. The total volume of the slots 16 is approximately 2.0 cubic inches.

After the rotor core 12 is assembled to the mounting block 38, the mounting block 38 is placed on the upper end 66 of the die plate 36. The lower ends of the slots 16 are aligned concentrically with the die 64 whereupon the center opening 14 of the rotor core 12 is aligned with axial hole 68. The bolt 44 and mandrel 40 are mounted so as to axially clamp the rotor core 12 in an aligned position on the die plate 36. The guide block 42 is placed on top of the mounting block 38 and these two parts are clamped together with the die plate 36 by means of the bolts 58. The extrusion chamber 54 is then formed adjacent the upper end of the rotor core and is concentrically aligned with the upper openings of the slots 16.

The aluminum slug 28 is placed in the extrusion chamber and the piston 62 and ram 60 are inserted therein on top of the slug 28. The cross-sectional area of the slug 28 is determined by the volume of conductive material required to form the conductor bars 20 and end rings 22 and 24. This determines the cross-sectional area and height of the slug 28. The volume of the slug 28 is sufficient to fill the slots 16, the die cavity 64 and leave a predetermined height of the terminal potion 30 of the slug 28 extending above the upper end of the rotor core 12. The terminal portion 30 of the slug 28 has substantially the same volume as the end ring 22 formed in the die cavity 64. The end rings 22 and 24 shown in FIGS. 1 and 2 have inner diameters of approximately 1.56 inch, outer diameters of approximately 2.62 inches and are slightly tapered radially inward so that they extend approximately 0.5 inch from the ends of the rotor core 12. The terminal portion 30 may be finished to correspond to end ring 24 by a die forming operation as described in connection with FIG. 10.

One typical aluminum slug used in the assembly 34 for the rotor core 12 has an outside diameter of 2.5 inches, an inside diameter 2.0 inches and a height of 2.25 inches. The slug weighs approximately 188 grams.

The extrusion press assembly 34 with the aluminum slug 28 is heated to a temperature slightly below the melting point of the slug 28. Alternatively, the slug 28 is first heated and then mounted in the extrusion press assembly. The slug 28 is a commercially available pure (99.75 percent minimum) aluminum material having a melting point of approximately 1,215° F. and is heated to a temperature slightly below this melting point, for example, in a range of 1,000° to 1,150° F. The uniaxial flow resistance or stress of the slug material is substantially reduced at this temperature range.

Pressure from a hydraulic press forces the ram 60 and piston 62 against slug 28 to deform it so that its flows into the slots 16. It is important that the temperature of the slug 28 is maintained so that it is safely below the melting temperature or a temperature which will not reach the incipient melting point which can cause melting of the slug material due to heat developed by extruding the slug 28. The ram 60 presses against the piston 66 with a force of approximately 100,000 pounds so that the heated slug flows into an intermediate position within the slots of the rotor core as indicated in FIG. 6. In this position the conductor bars are partially formed in the slots 16. The force and rate at which the piston is forced against the slug is a function of the extrusion ratio which is related to the relative cross sectional areas of the end openings of the slots 16 and the slug 28. It has been found that a force of 100,000 pounds causes the slug 28 to flow through the slots 16 at a rate approximately three times the rate that the piston 62 moves the slug 28.

The slug material is forced entirely through the rotor core slots as shown in FIG. 7 and into the die cavity 64. The slug material exiting from the ends of the slots is pressed in the die mold 64 so as to become rejoined by fusion bonding and forms a continuous ring conforming to the shape of the cavity 64. The bottom end ring 22 is formed in the cavity 64 in a substantially finished shape as shown in FIGS. 1 and 3. The extrusion is terminated by releasing the force applied by the ram 60 when the die cavity 64 is filled. Any excess slug material will flow out of the assembly through the vents 70. As noted hereinabove, the original cylindrical length of the slug 28 is such that the remaining terminal portion 30 extends above the upper end of the rotor core 12 so as to form the end ring 24 in an unfinished shape which is integral with the upper end of the conductor bars 20. If it is desirable, the terminal portion 30 may be used for the end ring 24 although it does not have the same finished shape of end ring 22. Thus, a squirrel cage winding assembly 18 is formed in the rotor core 12 when the final position of the extrusion press assembly is reached as shown in FIG. 7 wherein conductor bars 20 are formed with integral end ring portions at opposite ends thereof.

The ram 60 and piston 62 are removed from the extrusion assembly 34 and the bolts 58 and 44 are removed so that the parts of the assembly can be separated. The rotor core 12 with the squirrel cage winding assembly 18 is forced out of the mounting block 38. The end rings are operatively complete although further finishing or shaping may be provided by a die forming procedure or machining operation.

I have found upon examination of the conductive end rings 22 and 24 and conductor bars 20 that they are substantially free of voids, cracks and imperfections such as are found in the conductor bars and end rings formed by casting processes. Molten aluminum which is cast in a rotor core cools at an uneven rate from the outer portion of the castings toward the center causing shrinkage and thermal stress cracking. Voids are formed by the turbulence of the casting operation and dissolved gases which are trapped in the molten casting material.

The electrical effects of the imperfections were noted by measuring the conductivity of the aluminum conductor bars and end rings. These measurements were made by comparing the conductivity of a squirrel cage winding assembly formed by my process, as described hereinabove, to the conductivity of the conductor bars and end rings made by a casting process. The International Annealed Copper Standard (IACS) was used as a reference for conductivity wherein substantially pure aluminum is 64.17 percent and the commercially available pure aluminum forming the slug 28 used in my process and also the ingots used in the casting process has a conductivity of 61 percent Typical conductivity measurements of 50 to 55 percent were found in end rings of winding assemblies formed by a casting process. In the squirrel cage winding assembly 18 formed by my method, as described hereinabove, the end ring 22 had an IACS reference conductivity of 57 percent while the end ring 24 had the same conductivity as the slug 28 from which it was formed. Further, by visual and microscopic examination of sections of the squirrel cage winding assembly 18 it was found to be substantially free of defects, cracks and voids when compared to those observed in the conductor bars and end rings formed by the molten casting process.

Figure 8:
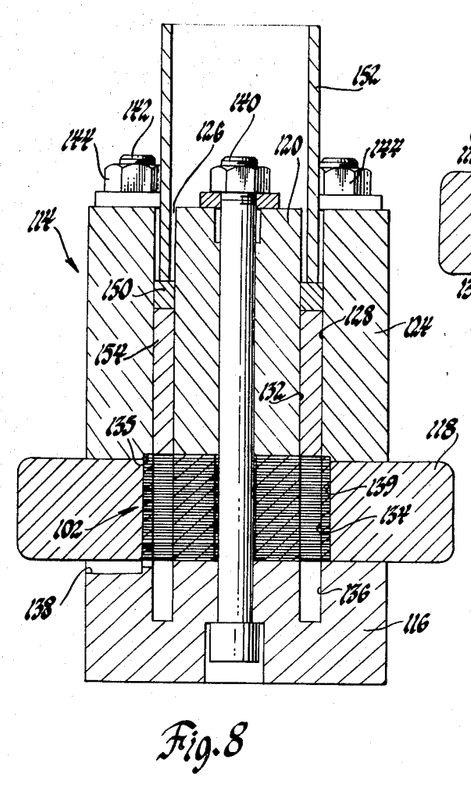
FIG. 8 is a sectional side elevational view of an extrusion press assembly used in an alternate method of the present invention.
Figure 9:
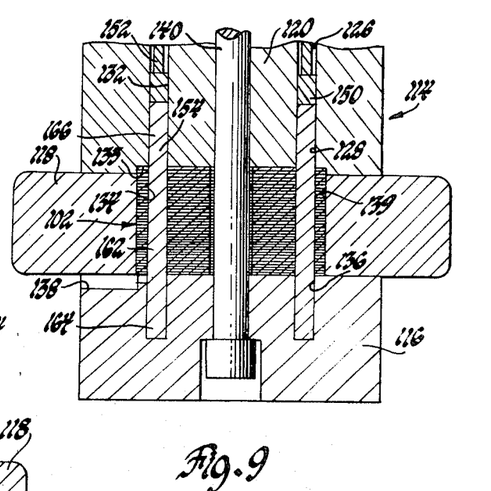
FIG. 9 is another view of the extrusion press assembly shown in FIG. 8 with the parts of the assembly having a position corresponding to a final operative position.
Figure 10:
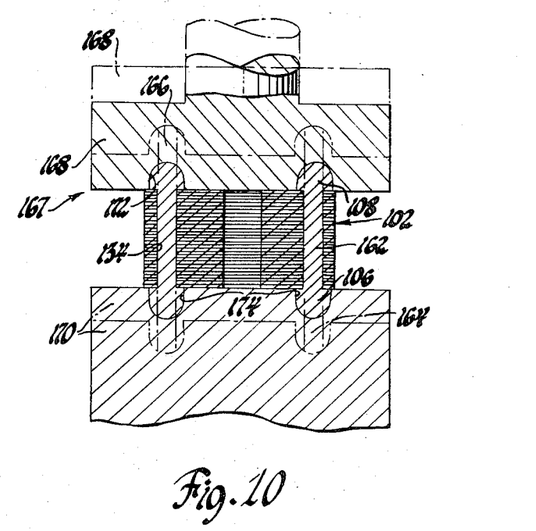
FIG. 10 is a sectional side view of a pair of die plates for forming finished end rings at the ends of a rotor after it has been removed from the extrusion press assembly shown in FIG. 9.
Figure 11:
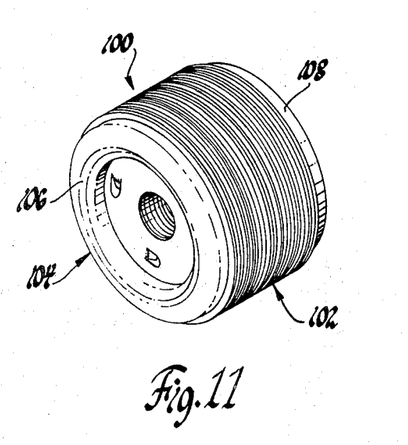
FIG. 11 is a perspective view of a squirrel cage rotor having finished end rings formed by the apparatus of FIG. 10.

FIGS. 8, 9 and 10 illustrate an alternative method and apparatus for fabricating a squirrel cage rotor 100 shown in FIG. 11 in accordance with the present invention. The rotor 100 includes a rotor core 102, identical to the rotor core 12 which is described in detail hereinabove, and further, the rotor core 102 includes a squirrel cage winding assembly 104 which is substantially identical to the squirrel cage winding assembly 18, also described hereinabove. In this alternative method, the finished shape of two end rings 106 and 108 is provided in a die forming procedure described in detail hereinbelow.

An extrusion press assembly 114 is illustrated in FIGS. 8 and 9 which includes component parts respectively corresponding to the parts of the extrusion press assembly 34 wherein modifications have been provided. The extrusion press assembly 114 includes a die plate 116, a rotor mounting block 118, a mandrel 120 and a guide block 124. An annular extrusion chamber 126 is formed between a cylindrical wall 128 formed by a circular bore extending through the guide block and a cylindrical wall 132 forming the outer surface of the mandrel 120.

The walls of the extrusion chamber 126 are parallel and are arranged to be positioned adjacent the ends of the rotor slots 134. The guide block 124 and mandrel 120 are slightly longer than the guide block 42 and mandrel 40 thereby extending the length of the extrusion chamber 126. Also, the width of the extrusion chamber opening is less, being approximately equal to the height of the openings of the slots 134 which are identical to the slots 16. The volumes of the extrusion chambers 126 and 54 are substantially equal. The lower end 135 of the cylindrical wall 128 has an enlarged diameter equal to the diameter of the rotor core to compensate for variations in rotor core heights.

The die plate 116 includes a die cavity 136 which is formed by a deep cylindrical groove extending into the upper end of the die plate 116. The sidewalls of the die cavity 136 are substantially parallel and are spaced apart substantially the same distance as are the walls 128 and 132 of the extrusion chamber 126. The volume within the die cavity 136 is substantially equal to the volume of the die cavity 64 whereby it is substantially deeper since it does not have as wide an opening. A plurality of vent openings 138 extend radially along the upper end of the die plate 116 between the outer sidewall of the die cavity 136 and the outer sides of the die plate 116.

The rotor mounting block 118 includes a cylindrical wall 139 for receiving the rotor core 102 and is the same as the mounting block 38. The mounting block 118 is clamped between the other parts of the extrusion press assembly 114 by means of the bolts 140 and 142 and nuts 144 which correspond respectively to the bolts 44 and 58 and nuts 48 of the extrusion press assembly 34 so that it is clamped together in a corresponding manner. Tight sealing joints are provided between the adjacent ends of the extrusion press assembly component parts so as to prevent seepage of the extruded material. A piston 150 slidably fits within the chamber 126 and a ram 152 transmits an extrusion force provided by a hydraulic press to the piston 150.

A hollow cylindrical slug 154 provides the conductive material for the squirrel cage winding assembly 104 of the squirrel cage rotor 100. A commercially available grade of substantially pure aluminum which corresponds to the aluminum material of the slug 28 is used and the volume of the slug 154 is substantially identical to the volume of the slug 28. The slug volumes are the same since the size of the squirrel cage winding assembly 104 is substantially identical to the squirrel cage winding assembly 18. The cross-sectional area of the slug 154 is reduced so that the walls of the slug 154 are thinner than those of the slug 28. Correspondingly, the length of the slug 154 is longer than the length of the slug 28. The cross-sectional area of the extrusion chamber 126 is complementary to the cross-section of the slug 154 so that it has a tight sliding fit along the chamber walls 128 and 132.

In accordance with the alternative method of this invention, the rotor 102 is press fitted into the mounting block 118 in the same manner as described for the mounting block 38. The component parts of the extrusion press assembly 114 are then assembled as shown in FIG. 8 and clamped together by means of the bolts 140 and 142 and nuts 144 to provide a sealing fit at the joints therebetween. The slug 154, piston 150 and ram 152 are mounted in the extrusion chamber 126 and the whole assembly is heated.

The slug 154 is heated to a temperature range of 1,000° to 1,150° F. as described hereinabove, and the ram 152 is actuated by a hydraulic press to force the piston 150 and apply pressure to the slug 154 so that it is forced against the upper end of the rotor core 102. The extrusion ratio, which is related to the ratio of the cross-sectional areas of the slug 154 and the openings of the slots 134, is less than for the extrusion apparatus illustrated in FIGS. 4 through 7. Accordingly, proportionally less extrusion force is required to be applied from ram 152. The slug is deformed by the slot openings provided in the end lamination at the upper end of the rotor core 102 and the slug material is extruded into the slots 134 as it is deformed so as to fill the slots 130 as illustrated in FIG. 9.

After the extrusion of the slug 154 fills the slots 134 to form conductor bars 162, the die cavity 136 is filled with the extrudate material exited from slot openings at the bottom of the rotor core 102. The material exited from the slots is pressed together within the die cavity 136 where fusion bonding occurs to provide a unitary lower annular section 164, as illustrated in FIG. 9. An upper annular section 166 is formed by a terminal unextruded upper portion of the slug 154 which has a height substantially identical to the height of the annular section 164. Accordingly, the upper and lower annular sections 166 and 164 are substantially identical and form a pair of hollow cylindrical portions which are integral with the conductor bars 162. The annular sections 164 and 166 have substantially the same volume of conductive material as the respective end rings 22 and 24 shown in FIGS. 1 and 2.

The rotor core 102 with annular sections 164 and 166 as shown in FIG. 9 is removed from the extrusion assembly 114 and is mounted in a press apparatus 167 illustrated in FIG. 10 which includes opposing die plates 168 and 170. The die plates 168 and 170 form the finished end rings 106 and 108. The opposing die plates 168 and 170 have substantially identical annular die cavities 172 and 174, respectively. The size and shape of the die cavities 172 and 174 correspond to the finished dimensions of the end rings 106 and 108. The die plates 168 and 170 are forced toward the ends of the rotor core 102 and against the ends of the annular sections 164 and 166 which are respectively aligned with the die cavity openings.

Prior to the die plates 168 and 170 being pressed against the annular sections 164 and 166, the apparatus is heated to an elevated temperature below the melting temperature of the slug material. The sections 164 and 166 will deform and be pressed into contours corresponding to the shape of the die cavities 172 and 174. The pressure of the die plates continues until the annular sections 164 and 166 are formed into the end rings 106 and 108 shown in FIG. 11. The end rings have a finished shape requiring little or no further machining procedures.

While the embodiments of the present invention as described hereinabove constitute preferred forms, it is understood that other forms might be adopted without departing from the spirit of my invention.

What is claimed is as follows:

1. A method of manufacturing a squirrel cage winding assembly employing an extrusion press for fabricating a plurality of conductor bar windings interconnected at each end by conductive end rings to a rotor core having a circumferential series of axial slots, the steps comprising: positioning said rotor core in an extrusion press including a die plate having an annular die cavity communicating with said axial slots at one rotor core end, positioning the other end of said rotor core adjacent an extrusion chamber communicating with said axial slots; placing a hollow slug of electrically conductive material in said extrusion chamber adjacent to and abutting said other end of said rotor core; heating said slug to a temperature below the melting point of said electrically conductive material to reduce the flow resistance of said slug; extruding said slug from said extrusion chamber axially into said axial slots to form conductor bars therein; forming a continuously bonded end ring portion in said annular die cavity from said electrically conductive material extruded into said die plate from said axial slots; and terminating said extruding when a predetermined unextruded terminal portion of said slug extends from said other end of said rotor core, whereby said conductive end rings are formed to integrally interconnect the ends of said conductor bar windings at each end of said rotor core.

2. A method of manufacturing a squirrel cage rotor employing an extrusion press for fabricating a squirrel cage winding assembly including a plurality of conductor bar windings interconnected at each end by conductive end rings, the steps comprising: assembling a stack of laminations having circumferentially spaced openings to form a rotor core having said openings aligned at a predetermined skew angle for providing a circumferential series of axial slots; mounting said rotor core in said extrusion press with the openings of said axial slots at one end of said rotor core positioned adjacent a die plate including an end ring die cavity communicating with said axial slots; positioning the other end of said rotor core adjacent an annular extrusion chamber formed by parallel extending cylindrical walls communicating with openings of said axial slots at said other end of said rotor core; providing a hollow cylindrical slug made of aluminum and having a predetermined size for being contained in said annular extrusion chamber; inserting said hollow cylindrical slug in said annular extrusion chamber adjacent to and abutting said other end of said rotor core; heating said hollow cylindrical slug within a temperature range which is below the melting point of said aluminum material so as to reduce the uniaxial flow resistance of said hollow cylindrical slug; applying force to said hollow cylindrical slug to extrude the slug from said annular extrusion chamber axially into said axial slots to provide conductor bar windings therein; forming said aluminum material exited from said one end of said rotor core and into said end ring die cavity so as to form a unitary conductive end ring which is integral with said conductor bar windings at said one end of said rotor core; terminating the applying force when a predetermined unextruded terminal portion of said hollow cylindrical slug extends from said other end of said rotor core to provide a conductive end ring which is integral with said conductor bar windings at said other end of said rotor core.

3. In a method of manufacturing a squirrel cage winding assembly for a rotor core having a circumferential series of axial slots, the steps comprising: positioning said rotor core in an extrusion press with one end adjacent an extrusion chamber so that said axial slots are in communication with said extrusion chamber; placing a hollow slug of electrically conductive material in said extrusion chamber adjacent to and abutting said end of said rotor core; heating said slug to a temperature below the melting point of said electrically conductive material to reduce the flow resistance of said hollow slug; extruding said hollow slug from said extrusion chamber axially into each of said axial slots; and terminating said extruding when said axial slots are filled with the extruded material from said hollow slug whereby a plurality of conductor bars for forming said squirrel cage winding assembly are deposited in said axial slots.

4. In a method of manufacturing a squirrel cage winding assembly employing an extrusion press for fabricating a plurality of conductor bar windings to a rotor core having a circumferential series of axial slots, the steps comprising: positioning said rotor core in an extrusion press with an end of said rotor core adjacent an extrusion chamber so that said axial slots are in communication with said extrusion chamber; placing a hollow slug of electrically conductive material in said extrusion chamber adjacent to and abutting said end of said rotor core; heating said slug to a temperature below the melting point of said electrically conductive material to reduce the flow resistance of said slug; extruding said hollow slug from said extrusion chamber axially into each of said axial slots to simultaneously form conductor bar windings therein; and terminating said extruding when a predetermined unextruded terminal portion of said hollow slug extends from said end of said rotor core, thereby forming a conductive end ring integrally interconnecting said conductor bar windings at said end of said rotor core.

* * * * *

UNITED STATES PATENT OFFICE
CERTIFICATE OF CORRECTION

Patent No. 3,683,493　　　　　　　　Dated August 15, 1972

Inventor(s) Charles Begovich

It is certified that error appears in the above-identified patent and that said Letters Patent are hereby corrected as shown below:

Column 2, line 4, after the period (.) delete the remainder of the line. Delete lines 5 through 15; line 32, after "rotor" insert -- core and --; Column 5, line 51, after "terminal" "po-" should read -- por- --; Column 9, line 7, after "slots", "134" should read -- 130 --.

Signed and sealed this 10th day of April 1973.

(SEAL)
Attest:

EDWARD M. FLETCHER, JR.　　　　　　ROBERT GOTTSCHALK
Attesting Officer　　　　　　　　　Commissioner of Patents